INVENTOR
THEODORIC B. EDWARDS
BY
ATTORNEY

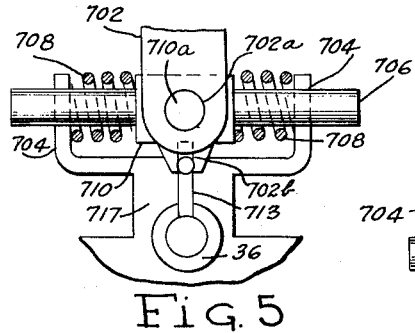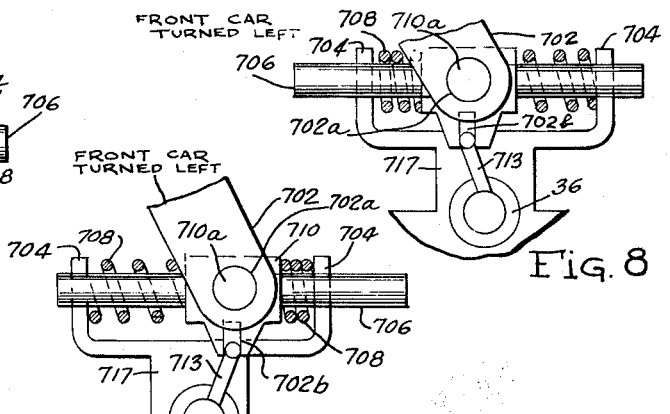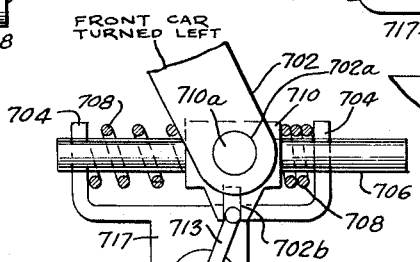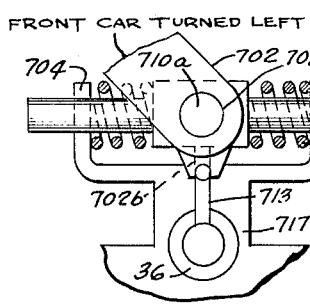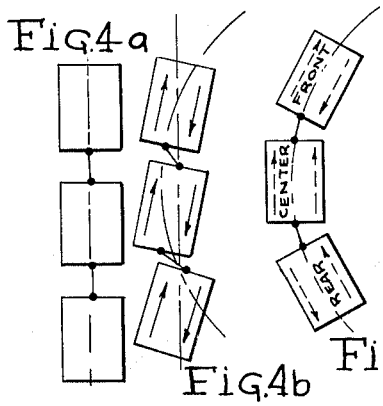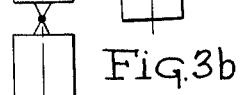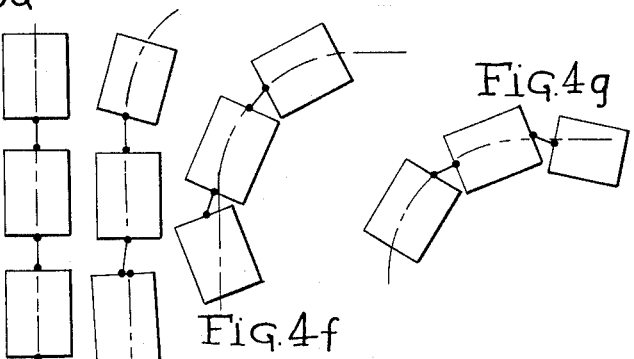

United States Patent Office 3,183,990
Patented May 18, 1965

3,183,990
MULTIPLE TRACK STEERING APPLICATION FOR A PLURALITY OF VEHICLES
Theodoric B. Edwards, Alexandria, Va., assignor to the United States of America as represented by the Secretary of the Army
Filed Jan. 29, 1963, Ser. No. 255,160
6 Claims. (Cl. 180—14)
(Granted under Title 35, U.S. Code (1952), sec. 266)

The invention described herein may be manufactured and used by or for the Government for governmental purposes without the payment to me of any royalty thereon.

The invention relates generally to improvements in steering a plurality of vehicles connected together end to end in line formation.

Conventional plural track vehicles, such as tractors and the like, are usually individually steered by mechanical braking means on each side of the driving differential coupled to a diesel or similar prime mover. If the track propelling means is a group of electrical motors connected to each individual track of a vehicle the steering or relative speeds of the tracks may be controlled by conventional electrical controller means in the circuit of each motor group.

Each of the above conventional mechanical and electrical steering methods absorbs substantial energy from the prime mover which results in a substantial loss of driving energy from the prime mover. Such steering methods are cumbersome, inefficient and not adaptable to a one man operator means of steering a plurality of track vehicles over rough terrain.

To overcome the above problems of steering of conventional track vehicles the illustrated embodiments of the invention disclose a plurality of multiple track vehicles flexibly coupled together in end to end relationship. Each vehicle or unit has right and left endless drive tracks. Each track may be driven by two or more electrical motors as a group. The motor group for each track is driven by a separate generator. Steering is accomplished by a manually steered vehicle of a coupled together vehicle group. A special mechanical-electrical coupling between the manually steered vehicle and one adjacent vehicle automatically actuates the variable potentiometer of a bridge network contained in a hitch mechanism attached as a propelling coupling between the adjacent ends of the two flexibly connected vehicles to drive the left and right tracks of the vehicles subservient to the manually steered vehicle of the vehicle group.

The primary object of this invention is to provide means and a method of steering a plurality of land vehicles, coupled together in train formation, over rough terrain from a control vehicle.

Another object of the invention is to provide a method and means for remotely steering track vehicles connected to a plurality of steered vehicles.

A further object of the invention is to provide means and a method of steering, by a single operator, a plurality of multiple track vehicles coupled together.

Another object of this invention is to provide an improved electric motor control system of great flexibility which is reliable, easy to operate, has a rapid rate of response and one especially adapted to the operation of a plurality of self-propelled vehicles, such as tractors and military vehicles, connected in train formation to negotiate any compound curve and reverse curve non-planar steering path.

Another object of the invention is to provide a method and means for steering a plurality of vehicles without substantial dissipation of prime mover energy in the steering means.

Another object of this invention is to provide a mechanical-electrical hitch steering assisting means and method which will permit all vehicles to track a steered vehicle.

Another object of this invention is to provide an individual control steering means between track vehicles dependently coupled together in train formation to a manually operated or radio directed vehicle.

Further objects of the invention will become apparent as the description proceeds, and the features of novelty will be pointed out in particularity in the course of the following specification and in the appending claims.

Figure 1:
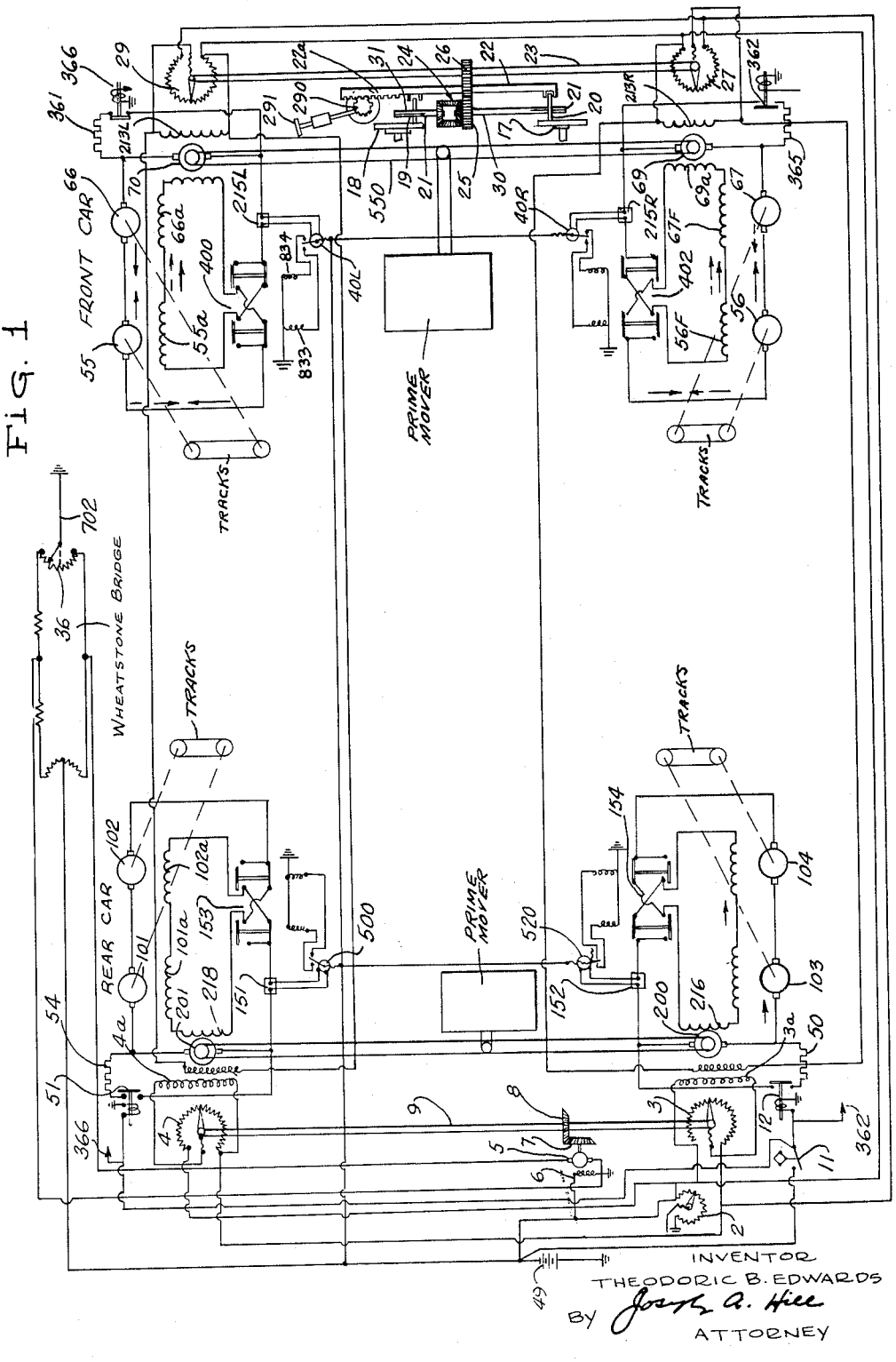
FIG. 1 illustrates an embodiment of the invention having a steering system for two track vehicles coupled together.

FIGS. 3a, 3b, and 3c illustrate the steering paths of different turning radii for vehicles coupled together in line formation by conventional hinge means;

FIGS. 4a, 4b, 4c, 4d, 4e, 4f and 4g illustrate in plan the steering paths of different turning radii for vehicles coupled together by the mechanical-electrical hitch means of this invention;

FIG. 5 illustrates in plan and detail the hitch of this invention in neutral steering position in which the tracks of all vehicles on one side are driven at the same rate as that of the tracks of the other sides of the train of vehicles;

FIG. 6 illustrates in plan the relative position of the members of the hitch means as the front vehicle is steered left without correction of the potentiometer;

FIG. 7 illustrates in plan the relative position of the members of the hitch as the front vehicle is steered left and the potentiometer of the second vehicle is correcting, by the potentiometer, for the steering of the command vehicle of the vehicle train; and FIG. 8 illustrates in plan the relative position of the members of the new hitch means in which the front car is steered left with overcorrecting, by the potentiometer, for the tracking of the second car.

Like parts in the drawings are designated by like reference numerals.

Referring to the drawings, certain circuits for reversing and braking operation of the vehicles have been abbreviated in details or purposely omitted to more clearly illustrate the primary steering system of the invention. Such circuits are referred to in my copending U.S. patent application Serial No. 142,746 filed October 3, 1961, and now U.S. Patent No. 3,109,972 issued November 5, 1963.

FIG. 1 is a schematic wiring diagram illustrating the primary steering system of the invention for two vehicles coupled together. Each vehicle has track treads for each side of the vehicle. Each track is driven by two or more series wound motors as a group. The motors for each track receive current from a separate compound wound electric generator. This generator is mechanically coupled to the generator supplying current to the opposite track of the same car. Both of these generators are driven by the same prime mover. However, if more than two vehicles make up the vehicle train, all of the vehicles may be driven by distribution of power from one prime mover for the whole train, if desired.

The propulsion means of each track of each vehicle of the vehicle train is substantially the same. Each track is driven by two motors and energized by a generator. The generator armature and the drive motor armatures are each connected in series circuit arrangement. The generator field winding and field windings of the two drive motors for each track are connected as a separate series circuit. A shunt picks off a portion of the current flowing in the armatures and operates a reversing contact relay means which maintains the current flow in the drive motor fields of a constant direction to provide regenerative braking as shown by arrows for the right track of the command vehicle of FIG. 1. An overspeed centrifugal governor switch 11 also switches a resistor bank into the circuit to provide dynamic braking and prevent overspeeding of the prime mover which drives both generators of a vehicle. The generator for the right track of the vehicle is mechanically coupled to the generator for the left track and when the right track generator, for example, is operating as a motor due to regenerative braking in the drive motors, it aids the prime mover in driving the left track generator of the vehicle. For example, a shunt 151 picks off a portion of the current flowing in the armature windings and operates a reversing relay 153 which maintains the current flow in the drive motor fields in a constant direction to provide regenerative braking. The overspeed centrifugal governor means 11 also switches a resistor load bank 50 into the series circuit to provide dynamic braking and prevent overspeeding of the prime mover which drives generators 69, 70, 200 and 201. Generator 69 for the right track of the command vehicle is mechanically coupled to the generator 70 of the left track and when the right track generator, for example, is operating as a motor due to regenerative braking in the drive motors, it aids the prime mover in driving the left track generator.

The power output of each generator on the front and rear units of FIG. 1 is controlled by a potentiometer 2 in series with potentiometers 3, 4, 27 and 29 which controls the degree of excitation of the generator shunt fields. Thus, by simultaneously increasing the power output of one generator and decreasing that of the other, steering of the unit is accomplished by driving the left and right tracks at different speeds The front or command unit steering potentiometers 27 and 29 are controlled by a friction gear feedback from the tracks and a differential gear output which simultaneously moves the steering potentiometers to increase the output of one generator and decrease the output of the other generator.

The command vehicle of FIG 1, in general, comprises motors 56 and 67 connected in series and energized by generator 69 for the right track of the vehicle, looking forward from the front end of the vehicle This track is controlled in speed by potentiometer 27 operably connected to manual steering means 291 and motors 55 and 66 energized by generator 70 for the other or left track of the vehicle, which speed is controlled by potentiometer 29 operably connected to manual steering means 291.

The vehicle subservient to the command vehicle in FIG. 1, in general, comprises motors 103 and 104 energized by generator 200 and selectively controlled by potentiometer 3 through motor potentiometer 5 for desired change in speed for the right track of the subservient vehicle. Motors 101 and 102 are energized by generator 201 and selectively controlled by potentiometer 4 interconnected by motor potentiometer 5 to selectively actuate the left track of the subservient vehicle in response to a command from the command vehicle.

More specifically, shunts 215L, 215R, 151 and 152 of FIG. 1 pick off a portion of the current flowing in armature circuits of motors 55, 66, 56, 67, 103, 104, 101 and 102 and operate reverse switching relays 400, 402, 154 and 153 which maintain the current flow in the drive motor fields in a constant direction to provide regenerative braking. Overspeed centrifugal governor 11 also switches resistor banks 361, 365, 50 and 54 into the series circuit to provide dynamic braking and prevent overspeeding of the prime mover which drives both generators of each vehicle unit.

During operation, if motors 56 and 67 tend to drive motors 55 and 66 through generator 70 and mechanical coupling 550 causing momentary reversal of current flow in the fields of motors 55 and 66 as indicated by dotted arrows in FIG. 1, this action would demagnetize fields 55a and 66a and prevent the motors from acting as generators. To prevent such demagnetization the current reverses in shunt 215L thus causing a reversal of current in rotor of permanent magnet motor 40L. This reversal of current actuates relay means 400 to reverse its contacts as a result of a current through coil 834 instead of 833. This reverses the direction of the field current and prevents substantial demagnetization of the motor fields. Motors 55 and 66 when acting as series generators (when traveling downgrade or being overrun in turning) deliver current to generator 70 which assists by mechanical connection 550 in driving generator 69 as a generator. Thus, steering the vehicle is accompanied by substantially no loss of energy as would be the case with conventional load resistors, and friction or hydraulic brakes.

The front vehicle of FIG. 1 is manually and initially steered by wheel 291 and friction wheels 19 and 20 which are driven at the same speed but in opposite directions by differential means 24. Wheels 19 and 20 are adjustably keyed to splined shafts 30 and 31 by key means 21 to permit operation of yoke means 22 and rack means 22a to cause shafts 30 and 31 to rotate in opposite directions at the same speed without causing motion of differential means 24. However, if steering wheel 291 is moved, pinion 290 moves yoke 22 by rack means 22a and causes wheels 19 and 20 to turn on crown wheels 17 and 18 causing shafts 30 and 31 to turn at different speeds. This causes differential means 24 to revolve in one direction or the other through gears 25 and 26 and shaft 23, causing potentiometers 27 and 29 to assume new positions. If the direction of rotation of potentiometers is such as to weaken shunt field 213R and to strengthen field 213L, respectively motors 66 and 55 speed up and motors 67 and 56 slow down to permit steering. Motors 66 and 55 thus tend to drive motors 56 and 67 causing a momentary reversal of current as indicated by dotted arrows in FIG. 1. This reaction would demagnetize fields 56F and 67F and prevent motors 55 and 66 from acting as generators. This reaction is prevented by the current reversing in shunt 215R causing a reversal of current in rotor of permanent magnet motor 40L. Motors 40L and 40R may be replaced by a moving coil similar to a galvanometer instead of a normal motor, if desired. This reaction reverses the direction of field current and prevents demagnetization of the above motor fields. Permanent magnet motors 40L, 40R, 500 and 520 are interconnected in circuit arrangement as shown. Motors 56 and 67 in the above arrangement now act as series generators delivering current to generator 69 which acts as a motor assisting in driving through mechanical connection 550 generator 70 as a generator. Thus, steering is positive and is accompanied by substantially no loss of energy, as would be the case with only conventional load resistors, friction or hydraulic brakes, or other conventional means. It is obvious that if instead of motion of the steering wheel 291 there was an accidental change of relative speed between friction discs 17 and 18 corrective action would be made by the hitch means of FIGS. 5, 6, 7 and 8 on a continuous curve in which a stable situation would be obtained with different speeds of friction wheels 17 and 18. Wheels 17 and 18 are each geared to its respective track for normal equalized steering during normal straight line travel of the vehicles, although such gearing connecting means is not shown for purposes of clarity.

Steering for the subservient vehicle of FIG. 1 is accomplished by mutual adjustment of potentiometers 27 and 29 by steering means 291 in the respective field windings 213R and 213L of generators 69 and 70 respectively, of the command vehicle which are interconnected in parallel circuit arrangement with field windings 216 and 218 of generators 200 and 201, respectively, of the subservient vehicle. Further, refinement in the steering of the subservient vehicle is accomplished through the Wheatstone bridge portion of the circuit means of FIG. 1 by the operation of variable potentiometer 36 by the hitch means of FIGS. 5, 6, 7 and 8 interconnecting the two vehicles. Motor 5 is energized by current supplied by battery means 49. Motor 5 controls by gear means 7 and 8 through mechanical coupling 9 potentiometers 3 and 4. The armature of motor 5 is connected to the Wheatstone bridge, as shown, containing variable potentiometer 36. Therefore, motor 5 makes further refined adjustment in the steering of the subservient vehicle to conform with the steering of the command vehicle by operating through shaft 9 potentiometers 3 and 4 to control the shunt fields of generators 200 and 201, which in turn control the relative speeds of motors 103 and 104 with respect to relative speed of motors 101 and 102 of the subservient vehicle of FIG. 1. Similarly, potentiometers 3 and 4 operated by motor 5 control the current in shunt fields 101a and 102a of motors 101 and 102 to conform with the operation and speed of motors 55 and 66 of the command vehicle. Potentiometer 2 as shown in the circuit of FIG. 1 is manually manipulated to control the overall combined forward speed of the command and subservient vehicles.

In FIG. 1, relay means 51, 12, 362 and 366 and permanent magnet motors of contactor means 500, 520, 40R and 40L may be energized by battery means 49, or other suitable means, as indicated by circuit connection for relays 12 and 51.

Figure 2:
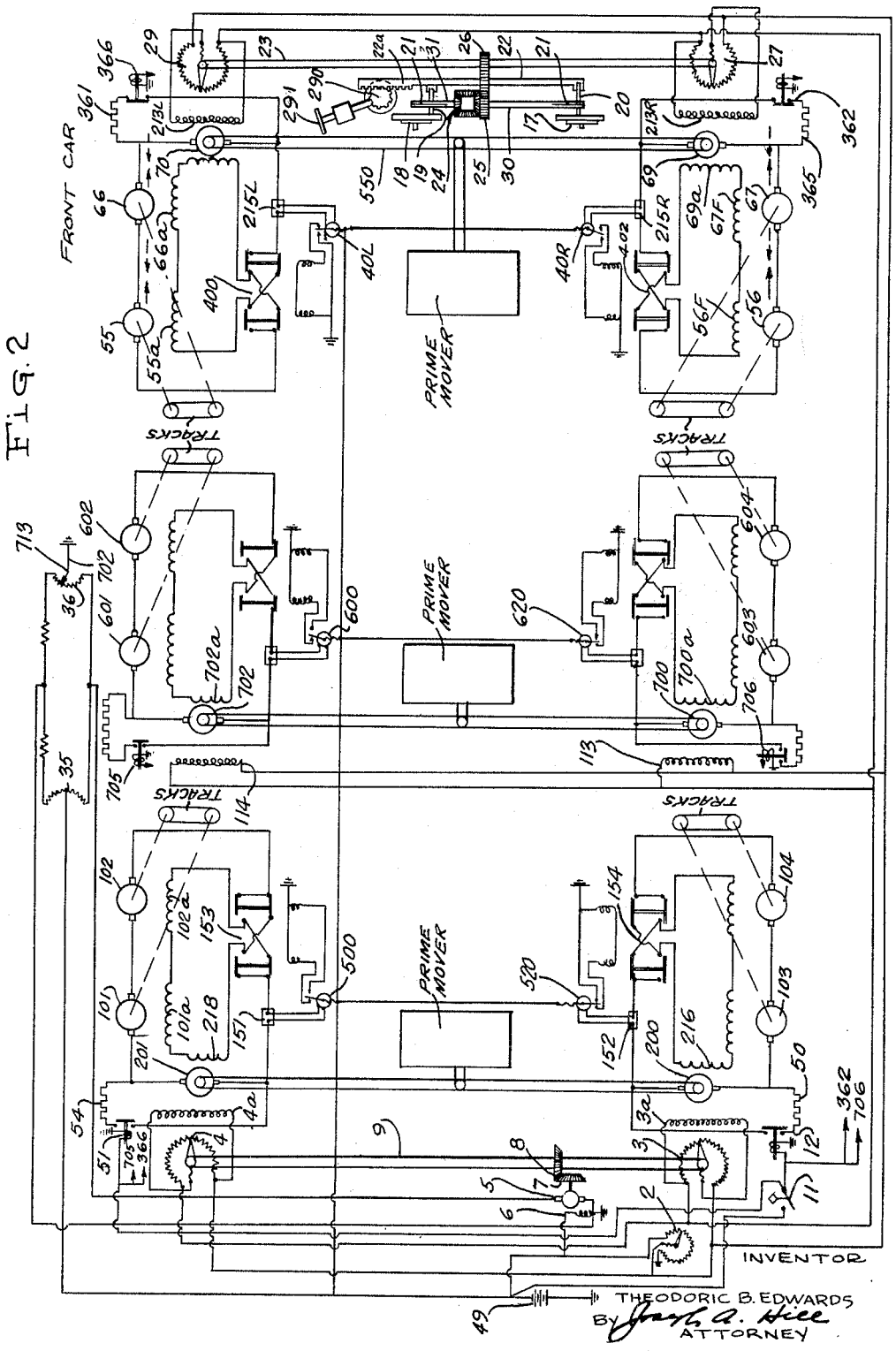
FIG. 2 illustrates another embodiment of the invention which steering is accomplished for three or more amphibious adapted vehicles and coupled together in line formation.

FIG. 2 is a schematic wiring diagram of three or more vehicles coupled together as a vehicle train adapted for amphibious operation or land operation and steered from a command vehicle. The corresponding parts, control circuits, and mode of operation of the command vehicle and rear subservient vehicle are the same as their counterparts of FIG. 1, except that the center vehicle unit or units have been added and the two illustrated subservient steered and controlled vehicles are both steered by being connected in the steering control circuit in parallel circuit arrangement with the control circuits of the command vehicle. The steering of the subservient vehicles are further corrected in steering to conform to the steering of the command vehicle by the assistance of mechanical-electrical hitch means illustrated in FIGS. 5, 6, 7 and 8 in a designated path of travel similar to the path of FIG. 4c, by the front and rear units of the train and the series motors so that all vehicle units uniformly adjust to any desired slight change of speed necessary for steering between the right and left tracks of the command vehicle of the vehicle train.

In FIG. 2, the command vehicle, in general, comprises motors 56 and 67 connected in series and energized by generator 69 to propel the right track of the vehicle, looking forward from the front end of the vehicle, which track is controlled in speed by potentiometer 27 operably connected to manual or command steering means 291. Motors 55 and 66 are energized by generator 70 to propel the other or left track of the vehicle, which track speed is controlled by potentiometer 29 operably connected to manual steering means 291 as in FIG. 1.

The vehicles of FIG. 2, subservient to the command vehicle in steering control, in general, comprise an intermediate vehicle unit and a rear vehicle. The rear vehicle is powered by generators 200 and 201. Generator 201 energizes motors 101 and 102 to drive the left track. The right track of the rear vehicle is powered by generator 200 which energizes motors 103 and 104. The intermediate vehicle unit is likewise subservient to the command vehicle and is connected to the steering control circuit in parallel circuit arrangement with the rear subservient vehicle. The intermediate vehicle unit comprises, in general, generator 700 which energizes motors 603 and 604 which armature circuits are connected in series with winding 700a to selectively drive or brake the right track of the intermediate vehicle unit, and generator 702 energizes motors 601 and 602 which armature circuits are in series with generator field winding 702a to drive or brake the left track of the intermediate subservient vehicle group of FIG. 2.

Steering operation of FIG. 2 is accomplished by manual steering means 291 by mutual adjustment of interconnected potentiometers 27 and 29, by mechanical connection 23 as shown, in the respective field windings 213R and 213L of generators 69 and 70 respectively. These circuits are interconnected in parallel circuit arrangement with field windings 3a and 4a of generators 200 and 201 of the rear subservient vehicle and in parallel circuit arrangement with field windings 113 and 114 of generators 700 and 702 respectively, of the intermediate subservient vehicle, respectively.

Steering for the subservient vehicles of FIG. 2, as in FIG. 1, is accomplished by mutual adjustment of interconnected potentiometers 27 and 29 by steering means 291 in the respective field windings 213R and 213L of generators 69 and 70 of the command vehicle which are further interconnected in parallel circuit arrangement with field windings 216 and 218 of generators 200 and 201, respectively. Field windings 113 and 114 of the intermediate subservient vehicle is likewise connected in parallel with field windings 213R and 213L of the command vehicle, as shown in FIG. 2.

In FIGS. 1 and 2 the rotor circuits of motors 56 and 67 are in series circuit arrangement with the rotor circuit of generator 69, and the field windings 56F and 67F of motors 56 and 67 respectively, are in series circuit arrangement with one another and in series with field winding 69a of generator 69. Load resistor 365 is connected in parallel circuit arrangement with the rotor circuit of generator 69 by relay means 362, energized by battery means 49 and actuated by centrifugal switch means 11 to prevent overspeed of the tracks of the vehicles. The series rotor circuit and the series field circuit of motors 56 and 67 and generator 69 are selectively interconnected by reversing contacts operated by relay 500 energized by battery 49 and operated by motor 40R in the steering control circuit for braking and other modes of operation for the right track of the command vehicle. Permanent magnet motors 40R, 40L, 500, 520, 600 and 620, are connected in the circuit as shown in FIG. 2. The series circuit of the rotors and field windings of motors 55 and 66 and generator 70 and load resistor 361 and relay means 366 are similarly connected across the rotor of generator 70 and all operate in the same manner for the left track as described above for the right track of the command vehicle.

Where four or more vehicles comprise a vehicle train and have a need to negotiate a sharp reverse curve (S-curve) of uneven terrain, the front portion and the rear portion of the train may each comprise separately manually steered front and rear command units or group of vehicles in accordance with the teaching of the manual steering, electrical control circuit and mechanical-electrical hitch steering correction means for various elevations of terrain of FIGS. 1, 2, 5, 6, 7, and 8.

FIGS. 3a, 3b and 3c show various steering paths of a conventional train of vehicles connected together by rigid pin coupling joints in which steering from the forward car in each of the illustrated paths result in an outward thrust on the couplers of the trailing vehicles causing the train to be unyielding and have a large turning radius.

FIG. 4a shows a train of vehicles moving in a straight line. FIG. 4b shows that steering with conventional operation of the tracks of a coupled train is impossible. FIG. 4c shows the necessary operation of the tracks. FIGS. 4d through 4g show the position of the vehicle with two hinged links negotiating a curve.

FIG. 5 discloses the position and operation of the hitch mechanism when the vehicle train is moving in a straight line of travel.

FIG. 6 discloses the position of the parts and operation of the hitch mechanism when the command vehicle has initiated the start of the left turn for the vehicle train.

FIG. 7 discloses the position of the members and mode of operation of the hitch mechanism in which the command vehicle is traveling left and part of the side thrust of the hitch between the command and second vehicle is being absorbed by the right hand spring means 708 and floating hitch connecting means 706.

FIG. 8 discloses in plan the position of the parts and operation of the hitch mechanism when the command vehicle is returning from a sharp left to a neutral position before turning right which shows the left hand spring means 708 under compression absorbing a reverse side thrust of the coupling and potentiometer 36 is overcorrecting for the reaction of floating hitch means containing members 702, 706, 710a, 702a and 717.

FIGS. 5, 6, 7 and 8 illustrate many of the various modes of operations of the new steering compensating hitch means having a correcting potentiometer which assists the manual steered command vehicle and substantially eliminates the conventional outward thrust on the coupling means between vehicles as the train is steered in a more maneuverable and tortuous steering path of a short turning radius over various elevations of rugged terrain.

More specifically, the hitch means of FIGS. 5, 6, 7 and 8 consists of a mechanical steering correction or compensating means and an electrical control circuit steering correcting or compensating means. Member 702 of the hitch is rigidly connected to the command vehicle, while member 717 containing extending Y-connecting members 704 is rigidly secured to the subservient vehicle unit of FIGS. 1 and 2. Members 717 and 702 are flexibly secured together mechanically, as shown by member 706 being spring biased for lateral movement in members 704 as an extension of member 717. Member 706 carries an intermediate enlarged portion 710 which terminates in extending pin portions 710a which pivotally fit in openings 702a of member 702. The electrical potentiometer 36 which has an extending radial arm 713 is carried by member 717. Arm 713 comates by suitable means as shown in slot 702b of member 710 to uniformly adjust potentiometer 36 to correct and compensate the steering system mechanically and electrically to conform with the steering of the command vehicle. Springs 708 equalize the hitch means mechanically, as shown in FIGS. 5, 6, 7 and 8, to relieve strain on the hitch means between the command and subservient vehicles and permit a more uniform and efficient correction in steering of the subservient vehicle. The electrical connections to potentiometer 36 are not shown except, in the circuits of FIGS. 1 and 2. Arm 713 of potentiometer 36 adjusts the potentiometer to further adjust track speeds of the subservient vehicle to conform electrically with the track speed of the command vehicle, as desired, for the vehicle train.

It is to be understood, that this invention is not limited to the particular circuits, components and arrangements thereof that have been submitted herewith for the purpose of illustration, but may encompass further changes and substitutions made therein without departing from the present invention as defined by the claims that are appended hereto.

I claim:

1. In a vehicle train, having a command vehicle and a subservient steered vehicle, each vehicle having a pair of tracks, an electric motor control steering system comprising a prime mover, a plurality of compound wound, direct current generators driven by said prime mover, a group of series wound motors operably connected in series circuit arrangement with said generators mechanically connected to each track for each of said vehicles, said group of motors for each track being energized by one of said generators, said generators for each track of each vehicle having their armatures interconnected by torque transferring means and adapted for regenerative braking during steering on tortuous and rough terrain, a mechanical-electrical hitch means adapted to connect two adjacent vehicles, said hitch means having a variable electrical resistance means arranged as a variable and separate divider of a bridge circuit operated by said hitch means and connected to the motors controlling the subservient vehicle tracks to correct the steering of said subservient vehicle to conform to the steering path of said command vehicle.

2. In a vehicle train having a command vehicle and at least one subservient vehicle, each vehicle having a pair of tracks and being self-propelled, a steering system comprising a prime mover, a plurality of compound wound, direct current generators driven by said prime mover, a group of series wound motors operably connected in series circuit arrangement with said generators mechanically connected to each track for each of said vehicles, said group of motors for each track being energized by one of said generators, said generators for each track of each vehicle having their armatures interconnected by torque transferring means and adapted for regenerative braking during steering on tortuous and rough terrain; a mechanical-electrical hitch means adapted to connect two adjacent vehicles, said hitch means having a plurality of variable resistance means arranged as a variable and separate divider circuit of a bridge circuit operated by said hitch means and connected to the motors controlling the subservient vehicle tracks to correct steering of a plurality of vehicles to conform to a desired steering path for a vehicle train.

3. A steering system for a train of self-propelled track vehicles adapted for operation by a single operator comprising an initially manually operated electrical control system including a prime mover, a plurality of compound wound, direct current generators driven by said prime mover, a group of series wound motors operably connected in series circuit arrangement with said generators mechanically connected to each track for each of said vehicles, said group of motors for each track being adapted to be energized by one of said generators, said generators for each track of each vehicle having their armatures interconnected by torque transferring means and adapted for regenerative braking during steering on tortuous and rough terrain; a mechanical-electrical hitch means being adapted to mechanically and electrically connect a command vehicle to a subservient steered track vehicle, said hitch means including a variable resistance means arranged in a bridge circuit of said electrical control system connected to the motors controlling the subservient vehicle tracks to automatically adjust the steering of a subservient vehicle to conform to the steering path of said command vehicle.

4. In an electric motor control steering system for a plurality of vehicles including a command vehicle and at least one subservient vehicle comprising a prime mover, a manual steering means; a plurality of compound wound direct current generators driven by said prime mover; a group of series wound motors operably connected in series armature circuit arrangement with the armature winding of one of said generators for energizing one track of said vehicle, said generators for each track of each vehicle having their armatures interconnected by torque transferring means and adapted for dynamic and regenerative braking during steering of the vehicle train over tortuous and rough terrain, a control steering circuit to selectively control said generators; a mechanical-electrical hitch means adapted to mechanically connect two adjacent vehicles, said hitch means comprising a floatable mechanical hitch and variable electrical resistance means arranged in said control circuit as a variable and separate circuit divider of a bridge circuit operated by said hitch means and connected to the motors controlling the subservient vehicle tracks to correct and adjust the steering of a subservient second vehicle to conform to the steering path of said command vehicle.

5. An electrical control steering system for simultaneously steering a train of vehicles comprising a command vehicle and subservient steered vehicles, a prime mover to energize said train of vehicles, a group of series connected motors adapted for propulsion of each side of each vehicle, generator means energized by said prime mover to selectively energize said group of motors for each side of each vehicle, said group of motors and said energizing generator means having their armature windings in series circuit arrangement and their field windings in a separate series circuit arrangement, shunt means in said field circuit and cooperating relay means for selectively interchanging said series circuit means to interchange the operating roles of the generator and motors on one or both sides of the vehicles so that selected motors may operate as generators during dynamic braking operations, speed control potentiometer means connected to selected pairs of said motors, manual steering means mechanically connected to said potentiometer means whereby said manual steering means is adapted to control the steering path of said command vehicle, interconnecting steering control circuit means for selectively steering said subservient vehicles to conform to the steering command of said command vehicle, and mechanical-electrical hitch means connecting said subservient steered vehicles to said command vehicle to mechanically adjust side thrust and to further correct operation of said electrical steering control circuit of the vehicle train to conform to a desired steering path in response to steering command signals from said command vehicle.

6. An electrical control steering system for a plurality of track vehicles, connected in train formation and adapted to negotiate any compound curve and reverse non-planar curve steering path comprising a command vehicle and a plurality of subservient steered vehicles, prime mover means to energize said train of vehicles, a group of motors connected in series circuit arrangement and adapted for propulsion of each track of each vehicle, generator means energized by said prime mover to selectively energize said group of motors for each track of each vehicle, said group of motors and said energizing generator means having their armature windings in series circuit arrangement and their field windings in a separate series circuit arrangement, shunt means in said field circuit and cooperating relay means for selectively interchanging said series circuit means to interchange the operating roles of the generator and motors on one or both sides of the vehicles so that a selected group of motors may operate as generators during dynamic braking operations, speed control potentiometer means connected to selected pairs of said motors, manual steering means mechanically connected to said potentiometer means whereby said manual steering means is adapted to control the steering path of said command vehicle, interconnecting steering control means for selectively steering said subservient vehicles to conform to the steering command of said command vehicle, and mechanical-electrical hitch means connecting said subservient steered vehicles to said command vehicle to mechanically adjust steering side thrust between said vehicles to further correct said electrical steering system to conform to a desired steering path.

References Cited by the Examiner
UNITED STATES PATENTS

| | | | |
|---|---|---|---|
| 1,267,742 | 5/18 | Bulley | 180—14 |
| 2,070,832 | 2/37 | Johnson | 180—79.1 |
| 2,393,618 | 1/46 | Edwards et al. | 180—6.5 X |
| 2,565,293 | 8/51 | Aydelott et al. | 180—6.5 X |
| 3,102,219 | 8/63 | LeTourneau | 180—6.5 X |
| 3,109,972 | 11/63 | Edwards | 180—65 |
| 3,123,167 | 3/64 | Lichti | 180—6.5 |

MILTON BUCHLER, *Primary Examiner.*

KENNETH H. BETTS, A. MARRY LEVY, *Examiners.*